United States Patent
Rayes et al.

(10) Patent No.: US 9,260,059 B2
(45) Date of Patent: Feb. 16, 2016

(54) FALSE WARNING REDUCTION USING LOCATION DATA

(71) Applicant: Robert Bosch GmbH

(72) Inventors: Freddy Rayes, Madison Heights, MI (US); Maria Eugenia Garcia Bordes, Gerlingen (DE)

(73) Assignee: Robert Bosch GmbH, Stuttgart (DE)

(*) Notice: Subject to any disclaimer, the term of this patent is extended or adjusted under 35 U.S.C. 154(b) by 48 days.

(21) Appl. No.: 14/261,580

(22) Filed: Apr. 25, 2014

(65) Prior Publication Data

US 2015/0307023 A1    Oct. 29, 2015

(51) Int. Cl.
G06F 17/10     (2006.01)
G06G 7/78      (2006.01)
G08G 1/16      (2006.01)
B60Q 9/00      (2006.01)
G01S 13/93     (2006.01)
G01S 17/93     (2006.01)
B60W 30/08     (2012.01)

(52) U.S. Cl.
CPC .............. *B60Q 9/008* (2013.01); *G01S 13/931* (2013.01); *G01S 17/936* (2013.01); *B60W 30/08* (2013.01); *G08G 1/16* (2013.01)

(58) Field of Classification Search
CPC ........ G01S 13/931; G08G 1/16; B60W 30/08
USPC ...................... 701/70, 301; 342/70
See application file for complete search history.

(56) References Cited

U.S. PATENT DOCUMENTS

| 5,929,753 A | 7/1999 | Montague |
| 6,201,493 B1 | 3/2001 | Silverman |
| 7,206,697 B2 | 4/2007 | Olney et al. |
| 7,576,679 B1 | 8/2009 | Orr et al. |
| 7,633,430 B1 | 12/2009 | Wichgers et al. |
| 8,370,056 B2 * | 2/2013 | Trombley et al. ............. 701/301 |
| 8,525,723 B2 | 9/2013 | Orr et al. |
| 2004/0153244 A1 * | 8/2004 | Kellum ........................ 701/301 |
| 2011/0141242 A1 * | 6/2011 | Fernandez Alvarez et al. 348/47 |
| 2011/0148609 A1 | 6/2011 | Dabholkar et al. |
| 2014/0025285 A1 * | 1/2014 | Trombley ..................... 701/301 |

FOREIGN PATENT DOCUMENTS

| DE | 102011084084 A1 | 4/2013 |
| DE | 102012211034 A1 | 1/2014 |
| WO | 0111388 A1 | 2/2001 |

OTHER PUBLICATIONS

International Search Report and Written Opinion for Application No. PCT/US2015/023644 dated Jul. 9, 2015 (13 pages).

* cited by examiner

*Primary Examiner* — Tuan C. To
*Assistant Examiner* — Isaac Smith
(74) *Attorney, Agent, or Firm* — Michael Best & Friedrich LLP

(57) ABSTRACT

A collision warning system for a host vehicle includes a false warning reduction arrangement. A collision sensor senses a presence of a target object within a forward path of a vehicle and a navigation system senses the global position of the vehicle. The collision warning system receives the location information and the target object to provide a collision warning to a vehicle operator. To avoid false alerts, the collision warning system compares target object and location to target objects and locations stored in a false alert database. When the target object is provided in the database, a warning is delayed or suppressed. The collision warning system also senses driver reactions to a warning. When a warning results in no reaction by a vehicle operator, the warning is considered a false alert, and the target object and location are stored in the false alert database.

18 Claims, 5 Drawing Sheets

FALSE WARNING REDUCTION USING LOCATION DATA

BACKGROUND

The present invention relates to a method and apparatus to reduce false alerts by a collision warning system.

Forward Collision Warning (FCW) systems are available in the market today. FCW systems use information from the outside world through radar, laser based sensors, or cameras to detect if a target object is obstructing the path of the host vehicle and alert the driver if there is danger of a collision.

In addition to the FCW function, there are now more advanced features in the market that will go the additional step and apply some level of autonomous braking. These operations are called Automatic Emergency Braking (AEB) functions.

The objective of the forward collision warning function is to warn the driver if the time to collision is past a certain threshold. This functionality is dependent on the classification of objects in front of the vehicle in a field of view of a sensor.

At times, the radar signals may reflect from traffic signs or large metallic objects in the roadway on the ground with a signal strong enough to falsely classify the detected object as a target object.

If this occurs, a false positive warning will alert the driver when no vehicle is directly in front of the host vehicle. This false alert may be confusing or annoying to the driver, causing a loss of trust in the FCW system. In some cases, the function may even trigger an autonomous emergency braking that will reduce the speed of the vehicle. An escalation may put the driver in danger if it is a false event and other vehicles are tailgating behind. Eventually, the driver may be annoyed to a point of turning the FCW system off entirely or to ignore future warnings.

SUMMARY

In one embodiment, the invention provides a method of reducing false collision warnings by: determining a presence of a target object within a path of a host vehicle, the presence indicating conditions for a collision; determining a present location of the host vehicle; determining whether the target object is stored in a false alert database for the determined present location; suppressing a warning when the target object and the location are stored in the false alert database, and providing a warning when the target object is not stored in the false alert database.

Another embodiment includes the steps of when a warning is suppressed, determining a reaction by a host vehicle operator to the target object within a time period, and when the host vehicle operator reacts within the time period, determining that the target object is not a false target object and removing the target object and the location from the false alert database.

In another embodiment, step of providing a warning is followed by a step of storing both the target object and the location in the false alert database when the host vehicle operator does not react to the object.

In one embodiment, before suppressing a warning, the forward collision warning system determines whether the target object at the location is classified as a ground/overhead structure or as a lateral structure, and when the object is classified as a ground/overhead structure, triggers a warning after a time delay.

In another embodiment of the invention, a method of reducing false collision warnings comprising the steps of: determining a presence of a target object within a path of a host vehicle, the presence indicating conditions for a collision; determining a present location of the host vehicle; determining whether the target object is stored in a false alert database for the determined present location; providing a warning when the target object and the location are not stored in the false alert database; determining a reaction by a host vehicle operator to the warning, and providing the target object and the present location to the false alert database when there is no reaction by the host vehicle operator to the warning.

In one embodiment, a reaction by a host vehicle operator comprises at least one of: actuating the brake system within a predetermined time with at least at a predetermined force, and changing a steering path of the host vehicle a predetermined amount.

In one embodiment, determining whether the target object is stored in a false alert database for the determined present location includes sending the location and the target object over a wireless network to a remote database and comparing the location and the target object to a stored location and stored target object.

In one embodiment, determining whether the target object is stored in a false alert database for the determined present location includes receiving a stored location and a stored target object over a wireless network from a remote database and comparing the determined location and the determined target object to the stored location and the stored target object.

In another embodiment, determining whether the target object is stored in the false alert database includes classifying the target object and comparing the classification of the target object with a stored target object that is stored at the same location in the false alert database.

Another embodiment of the invention is a system for reducing false collision warnings that includes a forward collision sensor for sensing a presence of a target object within a forward path of a host vehicle; a navigation system for determining a present location of the host vehicle; a reaction sensing device for determining a reaction by a host vehicle operator; a forward collision warning system including a processor; and a false alert database in communication with the processor for storing target objects and locations of the target objects, wherein the processor receives the presence of the target object from the forward collision sensor and the present location of the host vehicle from the navigation system, and communicates with the false alert database to determine whether a stored target object at a stored location corresponding to the location of the sensed target object is provided in the false alert database.

In one embodiment, the reaction sensing device for determining a reaction by a host vehicle operator is a brake sensing and control system, and an electronic stability control unit.

In one embodiment the false alert database is at a remote location and receives and stores target objects and locations from a plurality of other host vehicles.

In one embodiment, the processor of the forward collision warning system is configured to provide a warning signal to a warning unit that outputs at least one of a visual and audio warning when the sensed target object and the location do not match the stored target object at the same location, and the processor is configured to provide automatic emergency braking when the sensed target object and the location meet minimum parameters The solution presented by this invention is to reduce the cases of false positive alerts, while maintaining the benefit of FCW and AEB, which will increase the reliability, safety, and acceptance of the system Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
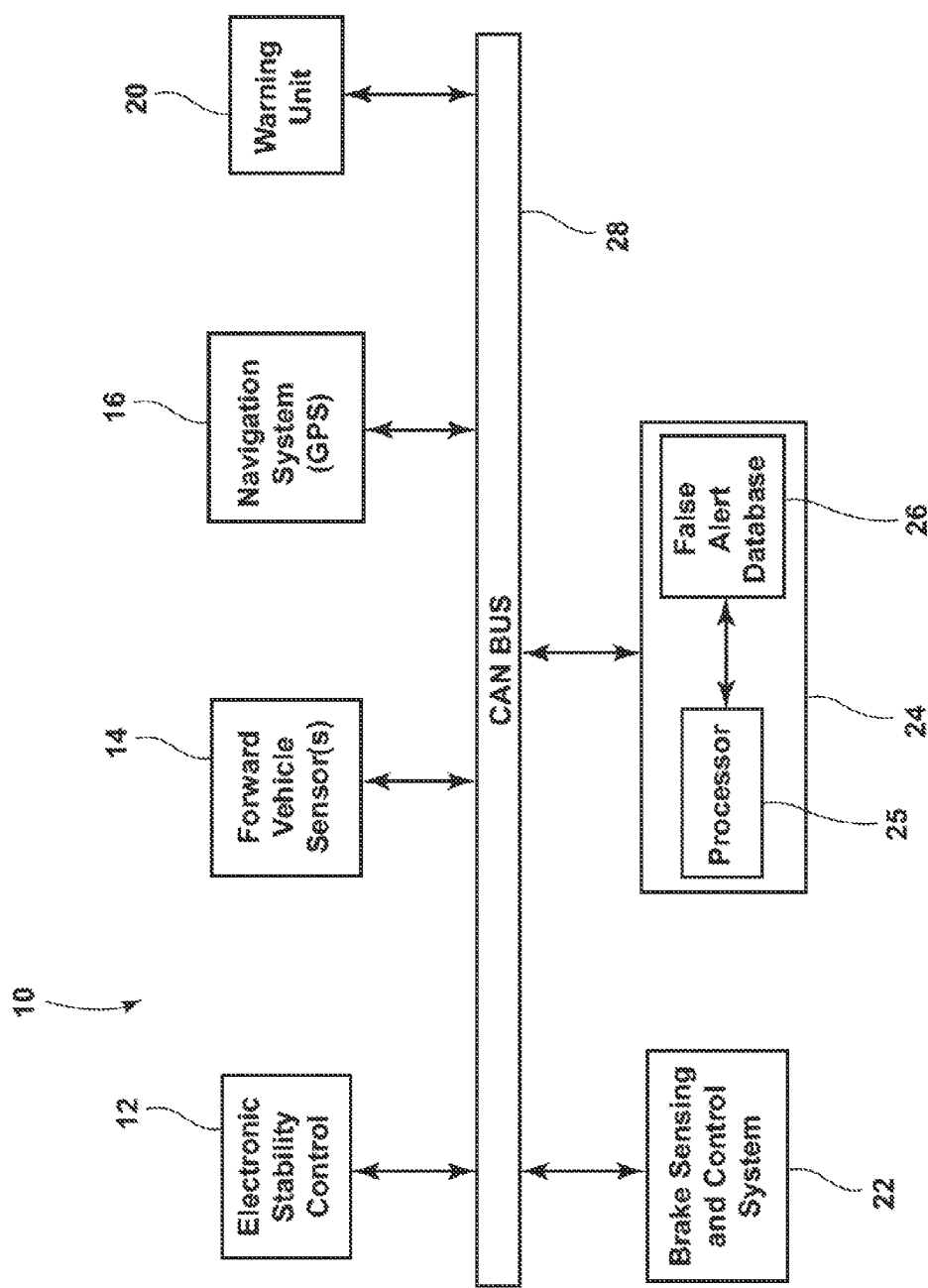
FIG. 1 is a block diagram of a vehicle control and alarm system.

FIG. 1 shows a block diagram of a vehicle control and alarm system 10 that includes an electronic stability control unit (ESC) 12, forward vehicle sensor(s) 14, a navigation system 16 and a warning unit 20. Further, the vehicle control and alarm system 10 includes a brake sensing and control system 22 and a forward collision warning system 24 having a processor 25 and a memory or false alert database 26. A CAN (controller area network) bus 28 connects the devices and systems for communication with each other. Additional vehicle systems utilizing the CAN bus 28, are not shown in FIG. 1.

Figure 2:
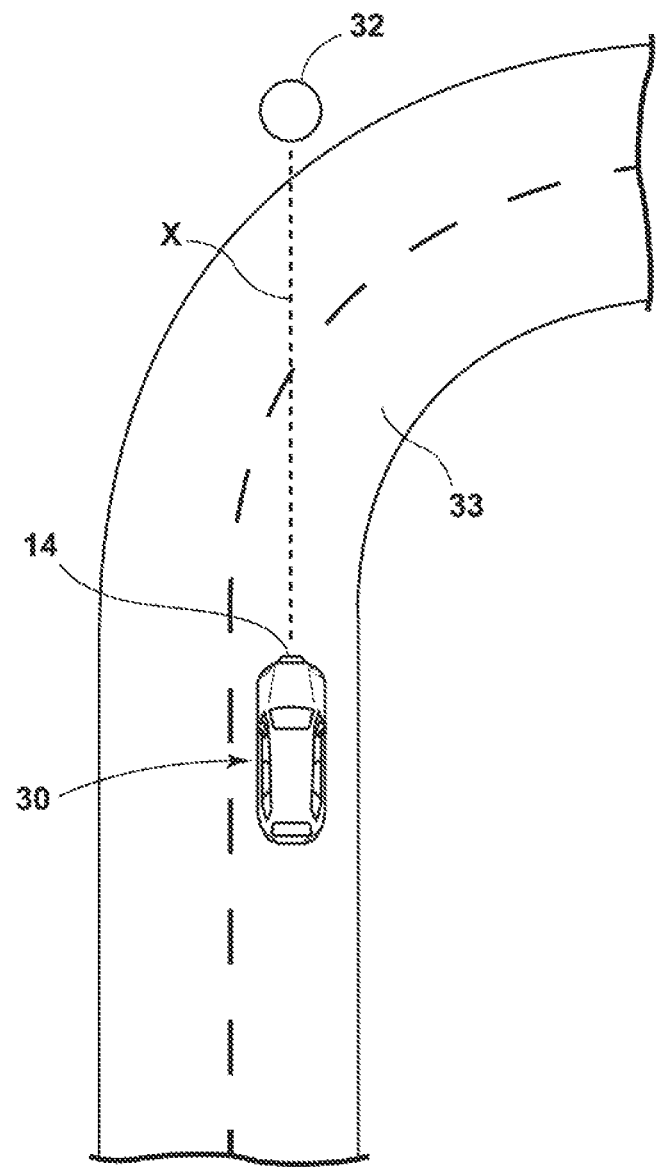
FIG. 2 is an overhead view of a first situational example of a host vehicle equipped with a forward collision warning system driving on a roadway.

The ESC unit 12 provides vehicle path driving data and information, such as yaw rate and yaw angle. The forward vehicle sensor 14 is one or more radar modules, light detecting and ranging (LIDAR) modules, or video detection modules. FIG. 2 shows the forward vehicle sensor 14 mounted on the front end of a host vehicle 30. An axis x defines a front direction from the vehicle. A y axis is transverse or perpendicular to the x axis. A traffic sign 32 is shown in FIG. 2 adjacent a vehicle roadway 33 is in alignment and view of the vehicle sensor 14 as the host vehicle 30 approaches a corner or turn in the roadway.

Based on processing of acquired radar or LIDAR data from the forward vehicle sensor 14, including the detection of objects, such as the traffic sign 32, and their location (a position in the front of the host vehicle 30 with respect to the x and y axis) and motion information (moving direction, speed), the detected object is determined. Thus, classification information includes motion information and other data obtained by the forward vehicle sensor 14. In some embodiments, the forward vehicle sensors 14 are various video detection modules based on processing of the images acquired, including the detection of lane markings, object classification (e.g. vehicle, pedestrian, guard rail, curbstone, etc), and detection of free path. The term "target object" includes target speed, classification, moving direction, type of object, and any other information obtained that is directed to the target.

In some embodiments, the forward collision warning system 24 determines a lateral distance to the object and when the lateral distance is less than about ½ a vehicle width or 0 meters laterally of the host vehicle, the object is classified as a ground/overhead structure, e.g. manholes and overhead traffic signs. In another instance, when the lateral distance is more than about ½ a vehicle width of the host vehicle, the object is classified as a lateral structure.

In some embodiments, the forward vehicle sensor 14 includes a fusion system that takes data from different types of object detection devices, either calculated in a front view camera or in one of the radar units or in an electronic control unit (ECU) (not shown), that fuses the information of all forward vehicle sensors. In some embodiments, the forward collision warning system 24 performs the determination of the objects, including classification thereof.

The navigation system 16 includes a global position system (GPS) or other arrangement to calculate the location of the host vehicle 30. The forward collision warning system 24 receives the position of the host vehicle 30 from the navigation system 16 over the CAN bus 28. The GPS position, in combination with the data from the forward vehicle sensor or sensors 14, allows the forward collision warning system 24 to determine the exact location of a detected target object 32.

The warning unit 20 provides audio and/or visual warnings in response to the forward collision warning system 24 providing a signal over the CAN bus 28 after determining a dangerous collision situation.

The brake sensing and control system 22 provides braking signals to the forward collision warning system. The ESC unit 12 and the brake sensing and control system 22 act as a reaction sensing device wherein a reaction by a vehicle driver is determined by changes in steering and braking. A reaction is determined by a number of factors including the distance from the target object 32 and the amount of braking or the speed of and amount of movement of the steering wheel.

The forward collision warning system 24 includes a memory or false alert database 26 that stores previously determined target objects 32, including the classification thereof. Further, the forward collision warning system 24 provides a corresponding location for the target object. Finally, without a reaction being sensed by the ESC unit 12 or the brake sensing and control system, the forward collision warning system 24 will not consider the target object to be a danger, but instead a false alert. Thus, when no reaction occurs, the target object and location are stored in the false alert database 26. The false alert database 26 is shown connected directly to the forward collision warning system 24. In some embodiments, the forward collision warning system 24 communicates with the false alert database 26 over the CAN bus 28.

Figure 3:
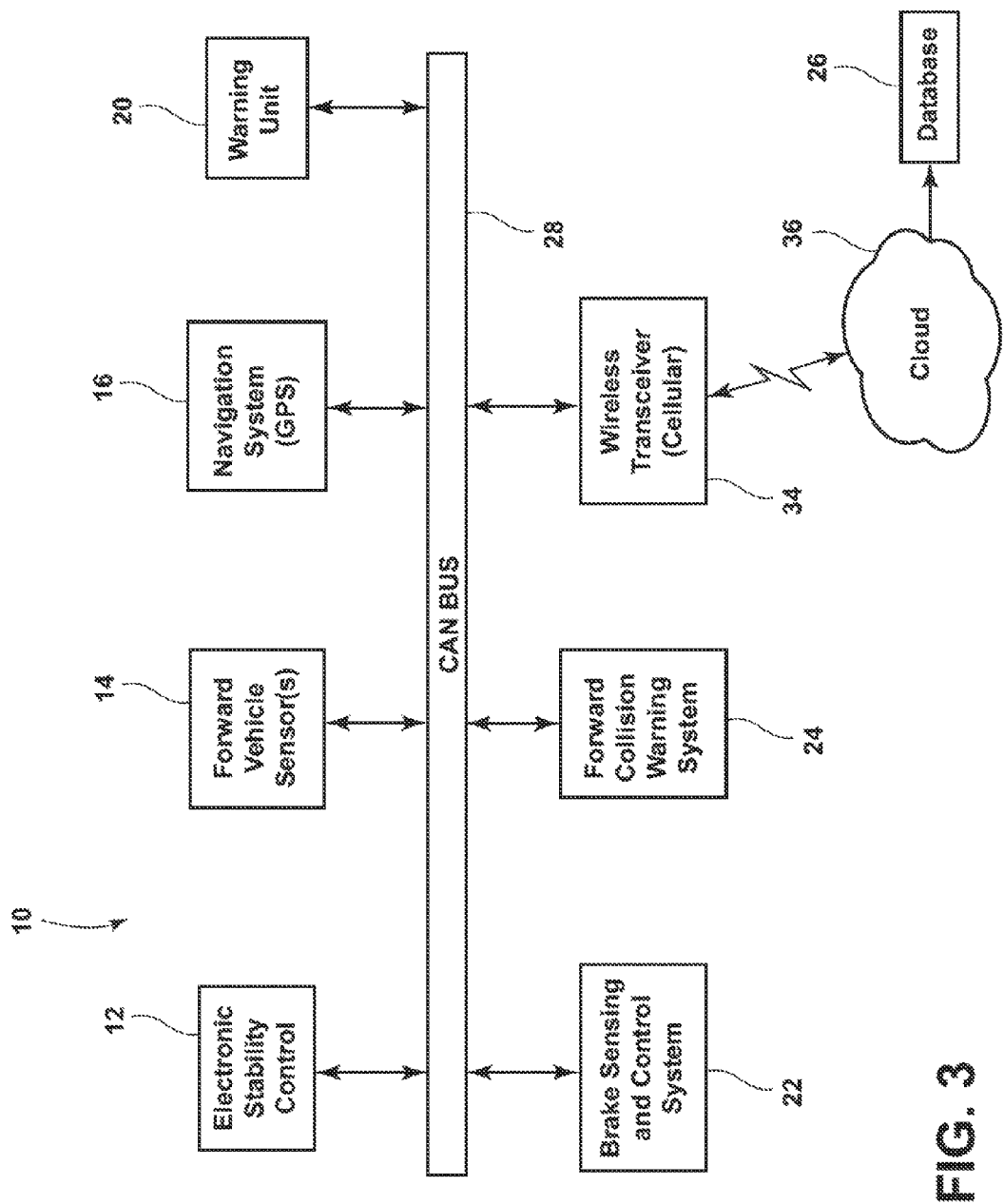
FIG. 3 is a block diagram of the vehicle control and alarm system including wireless communication to a remote location.

FIG. 3 shows another embodiment of the invention, wherein like units have the same reference numbers. The difference in FIG. 3 is that the false alert database 26 is provided at a remote location. In FIG. 3, a wireless transceiver 34 communicates with a remote false alert database 26 over the cloud 36. The wireless transceiver 34 can provide a cellular or satellite connection. In some embodiments, two-way information is provided so that the forward collision warning system 24 receives target objects and locations for comparison with sensed objects and their positions. Such information can identify hotspots or false alert zones that many vehicle operators have issues with. Further, the forward collision warning system 24 provides target objects 32 and their locations to the remote false alert database 26 for storage therein.

Operation

Figure 4:
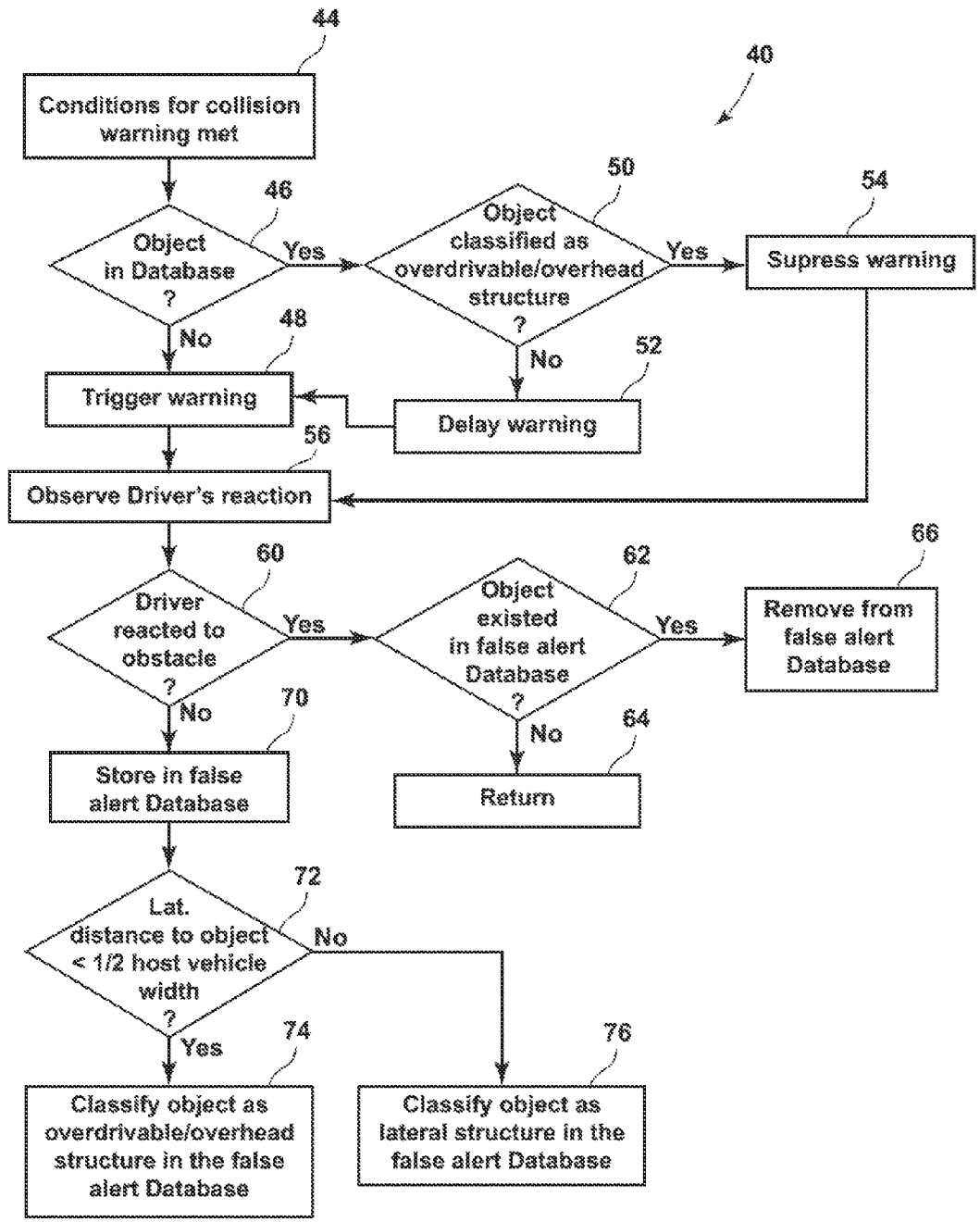
FIG. 4 is a flowchart of a method for determining when to suppress false collision warnings.

Operation of the system for reducing false collision warnings is illustrated in FIG. 4. FIG. 4 shows a flowchart of an operating routine 40 with the steps of operating the forward collision warning system 24. More specifically, at step 44, the forward collision warning system 24 determines if the conditions for collision warning are met by determining if a target object 32 is present and if the target object is located in a dangerous zone and/or traveling along a dangerous path. At step 46, the target object 32 and the location thereof are compared with a target object at the same location that is stored in the false alert database 26. If the object is not in the false alert database 26, a warning is output by the warning unit 20 at step 48.

If an object and location from the false alert database 26 matches a determined object and location determined by the forward collision warning system 24, the routine 40 advances to step 50. At step 50, if the target object is not classified as an overdrivable or ground structure/overhead structure, a warning is delayed at step 52. The delay depends on the classification of the structure, as some structures and distances do not present an immediate threat of a collision. After the delay, the routine 40 advances to step 48 and triggers a warning that is output by the warning unit 20. After a certain alarm time, the routine advances to step 56.

In the instance that the target object 32 is a ground or overhead structure at step 50, the routine 40 advances to step 54. At step 54, the target object does not generate an alarm. Instead, the output is suppressed and the routine 40 advances to step 56. At step 56 the reactions of the vehicle operator are observed. At step 60, outputs from the ESC unit 12 and/or the brake sensing and control system 22 are compared to threshold values stored in the forward collision warning system 24 to determine whether an operator reaction has occurred.

When a reaction has occurred, the routine 40 advances to step 62. At step 62, the forward collision warning system compares whether the object and location existed in the false alert database 26. If the object and location are not in the false alert database 26, the warning or alarm is considered to have been necessary. Thus, no other action occurs and at step 64 the routine 40 returns to step 44. If at step 62 the object is determined to exist at the location in the false alert database 26, the routine 40 advances to step 66. At step 66, the object and location are removed from the database 26 and the routine 40 returns to step 44.

Returning to decision step 60, in the event no driver reaction is determined, the routine 40 advances to step 70. At step 70, the classified target object and the location are stored in the false alert database 26.

The routine advances to step 72. At step 72, the lateral distance to the target object is determined. If the lateral distance is less than about ½ the host vehicle width, the routine 40 advances to step 74. At step 74, the target object is classified as an object with an overdrivable/ground located or overhead structure and stored in the false alert database 26. Then the routine 40 returns to step 44.

At step 72, when the lateral distance to the object is not less than about ½ the host vehicle width, the routine 40 advances to step 76. At step 76, the target object is classified as a lateral structure and stored in the false alert database 26. Then the routine 40 returns to step 44. The operation of the routine 40 enables the vehicle collision warning system to self-learn to minimize false warnings.

While the routine 40 in FIG. 4 only discloses providing a warning of a possible forward collision, in additional embodiments when a collision is very imminent, the forward collision warning system 24 sends a braking signal to the brake sensing and control system 22 over the CAN bus 28 to begin vehicle braking almost simultaneously with the providing of a collision warning to a vehicle operator. Such, automatic emergency braking (AEB) reduces the probability of a collision as delay due to the reaction time of the vehicle operator is eliminated. In some embodiments, the processor of the collision warning system 24 is configured to provide automatic emergency braking when the sensed target object and the location meet minimum parameters that identify an imminent collision, such as when an object appears suddenly and a close distance from the vehicle.

Figure 5:
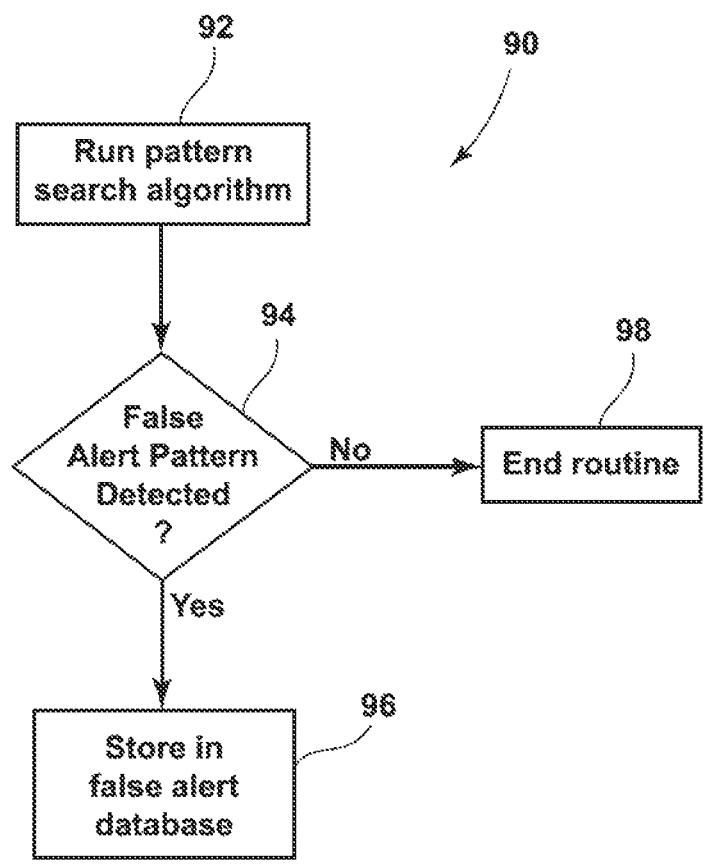
FIG. 5 is a flowchart of a method for processing and storing multiple occurrences of a target object disposed at the same location.

FIG. 5 shows a flowchart of a search pattern routine 90 for building the false alert database 26. At times, the processor of the forward collision warning system 24 and/or the CAN bus 28 is not available due to other vehicle operations. Thus, target objects and locations obtained by the forward collision warning system 24 are stored in the false alert database 26 for future processing. At step 92, the routine 90 executes a run pattern search algorithm that searches for situations stored in memory. At step 94, if a pattern is found for multiple occurrences of a target object at the same location, the routine advances to step 96. At step 96, a false alert for the classified target object and the location thereof are stored in the false alert database 26. If no false alert is received at decision step 94, the routine 90 advances to step 98, wherein the operation of routine 90 is completed.

The function for reducing these false alerts will require location data from a GPS sensor. For each collision alert, the sensor will store some environmental information in memory to be later used for the above pattern detection algorithm. This data includes: location of the object; heading direction of the host vehicle; average velocity of the host vehicle; and distance to the object. In some embodiments, the vehicle operator can selectively input a false alert signal to store the object and the location as a false alert.

In addition, for each alert, a check would be performed with a database (i.e. blacklist) to determine if the alert should be delayed. If the current condition is found existing in the database, then the alert would be shown as an increased probability of being false and cause the error to occur later. Otherwise the alert is sent to the driver.

While a CAN bus 28 is disclosed, any type of vehicle communication bus is contemplated. Other protocols, including but not limited to Ethernet and Flexray, are within the scope of the invention.

Thus, the invention provides, among other things, a self-learning collision warning system that determines false alerts to minimize warnings to a vehicle operator. Various features and advantages of the invention are set forth in the following claims.

What is claimed is:
1. A method of reducing false collision warnings comprising the steps of:
   determining a presence of a target object within a path of a host vehicle with a sensor, the presence indicating conditions for a collision;
   determining a present location of the host vehicle;
   determining whether the target object is stored in a false alert database for the determined present location;
   suppressing a warning when the target object and the location are stored in the false alert database;
   when the warning is suppressed, determining a reaction by a host vehicle operator to the target object within a time period with a reaction sensing device;
   when the host vehicle operator reacts within the time period, determining that the target object is not a false target object and removing the target object and the location from the false alert database, and
   providing a warning when the target object is not stored in the false alert database.

2. The method of claim 1, wherein the step of providing a warning is followed by a step of storing the target object and the location in the false alert database when the host vehicle operator does not react to the object, the target object including data about the object.

3. The method of claim 2, including, subsequent to storing the object and the location in the false alert database, determining a lateral distance to the object and when the lateral distance is less than about ½ a vehicle width of the host vehicle, classifying the object as a ground/overhead structure in the false alert database.

4. The method of claim 3, including, subsequent to storing the object and the location in the false alert database, determining a lateral distance to the object and when the lateral distance is more than about ½ a vehicle width of the host vehicle, classifying the object as a lateral structure in the false alert database.

5. The method of claim 4, wherein the lateral structure is a traffic sign or guard rail adjacent a vehicle roadway.

6. The method of claim 1, including, before suppressing a warning, determining whether the target object at the location is classified as a ground/overhead structure, and when the object is classified as a ground/overhead structure, triggering the warning after a time delay.

7. The method of claim 1, wherein a reaction by the host vehicle operator comprises at least one of: actuating the brake system within a predetermined time with at least at a predetermined force, and changing a steering path of the host vehicle a predetermined amount.

8. The method of claim 1, wherein the step of determining the presence of a target object with the sensor comprises controlling a radar or LIDAR disposed at a front end of the host vehicle to detect a forward collision.

9. The method of claim 1, wherein the step of determining whether the target object is stored in a false alert database for the determined present location comprises sending the location and the target object over a wireless network to a remote database and comparing the location and the target object to a stored location and stored target object.

10. The method of claim 1, wherein the step of determining whether the target object is stored in a false alert database for the determined present location comprises receiving a stored location and a stored target object over a wireless network from a remote database and comparing the determined location and the determined target object to the stored location and the stored target object.

11. The method of claim 1, wherein the step of determining whether the target object is stored in the false alert database comprises classifying the target object and comparing the classification of the target object with a stored target object that is stored at the same location in the false alert database.

12. A system for reducing false collision warnings comprising:
a forward collision sensor for sensing a presence of a target object within a forward path of a host vehicle;
a navigation system for determining a present location of the host vehicle;
a reaction sensing device for determining a reaction by a host vehicle operator;
a forward collision warning system including a processor; and
a false alert database in communication with the processor for storing target objects and locations of the target objects,
wherein the processor receives the presence of the target object from the forward collision sensor and the present location of the host vehicle from the navigation system, and communicates with the false alert database to determine whether a stored target object at a stored location corresponding to the location of the sensed target object is provided in the false alert database, when the sensed target object is provided in the false alert database and the reaction sensing device determines a reaction by a host vehicle operation within a given time period, the processor determines that the sensed target object is not a false target object and removes the target object and the location from the false alert database.

13. The system of claim 12, wherein the reaction sensing device for determining a reaction by a host vehicle operator comprises at least one of: a brake sensing and control system, and an electronic stability control unit.

14. The system of claim 12, wherein the processor determines the location of the target object from the present location of the host vehicle, along with distance and direction information for the target object provided by the forward vehicle sensor.

15. The system of claim 12, wherein the processor communicates with the false alert database over a wireless network and wherein the false alert database is disposed at a remote location and not disposed on the host vehicle.

16. The system of claim 15, wherein the false alert database receives and stores target objects and locations from a plurality of other host vehicles.

17. The system of claim 16, wherein the false alert database provides stored target objects and corresponding stored locations received from the plurality of other host vehicles to the host vehicle when one of the stored locations from the false alert database matches the location of the target object sensed by the forward collision sensor.

18. The system of claim 12, wherein the processor of the forward collision warning system is configured to provide a warning signal to a warning unit that outputs at least one of a visual and audio warning when the sensed target object and the location do not match the stored target object at the same location, and the processor is configured to provide automatic emergency braking when the sensed target object and the location meet minimum parameters.

* * * * *